(12) United States Patent
Alman et al.

(10) Patent No.: US 7,900,811 B1
(45) Date of Patent: Mar. 8, 2011

(54) METHOD FOR PRODUCING COMPONENTS WITH INTERNAL ARCHITECTURES, SUCH AS MICRO-CHANNEL REACTORS, VIA DIFFUSION BONDING SHEETS

(75) Inventors: David E. Alman, Corvallis, OR (US);
Rick D. Wilson, Corvallis, OR (US);
Daniel L. Davis, Albany, OR (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 35 days.

(21) Appl. No.: 12/394,084

(22) Filed: Feb. 27, 2009

Related U.S. Application Data (63) Continuation-in-part of application No. 11/181,973, filed on Jul. 15, 2005, now abandoned.

(51) Int. Cl.
*B23K 20/02* (2006.01)
(52) U.S. Cl. .................. 228/228; 228/173.2; 228/227; 228/233.1; 228/234.1; 228/235.1; 228/262.1; 19/49; 505/432; 156/312
(58) Field of Classification Search ............... 228/173.2, 228/227, 228, 233.1, 234.1, 235.1, 262.1; 419/49; 505/432; 156/312
See application file for complete search history.

(56) References Cited

U.S. PATENT DOCUMENTS

| 6,068,179 | A * | 5/2000 | Fowler ........................... 228/157 |
| 6,514,066 | B1 * | 2/2003 | Bergman .................... 425/405.2 |
| 2003/0082311 | A1 * | 5/2003 | Kono et al. .................... 427/455 |
| 2004/0099712 | A1 * | 5/2004 | Tonkovich et al. ........... 228/193 |

FOREIGN PATENT DOCUMENTS

GB 2063747 A * 6/1981

* cited by examiner

*Primary Examiner* — Jessica L Ward
*Assistant Examiner* — Erin B Saad
(74) *Attorney, Agent, or Firm* — James B. Potts; Mark P. Dvorscak; John T. Lucas (57) ABSTRACT

This invention relates to a method for producing components with internal architectures, and more particularly, this invention relates to a method for producing structures with micro-channels via the use of diffusion bonding of stacked laminates. Specifically, the method involves weakly bonding a stack of laminates forming internal voids and channels with a first generally low uniaxial pressure and first temperature such that bonding at least between the asperites of opposing laminates occurs and pores are isolated in interfacial contact areas, followed by a second generally higher isostatic pressure and second temperature for final bonding. The method thereby allows fabrication of micro-channel devices such as heat exchangers, recuperators, heat-pumps, chemical separators, chemical reactors, fuel processing units, and combustors without limitation on the fin aspect ratio.

20 Claims, 7 Drawing Sheets

METHOD FOR PRODUCING COMPONENTS WITH INTERNAL ARCHITECTURES, SUCH AS MICRO-CHANNEL REACTORS, VIA DIFFUSION BONDING SHEETS

CROSS-REFERENCE TO RELATED APPLICATIONS

This application is a continuation-in-part of U.S. application Ser. No. 11/181,973 filed Jul. 15, 2005 now abandoned.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

This invention relates to a method for producing components with internal architectures, and more particularly, this invention relates to a method for producing structures with microchannels via the use of diffusion bonding of metals, ceramics, and polymers.

BACKGROUND OF THE INVENTION

Chemical reactors typically define a large volume within which reactants are placed. The only surfaces these reactants encounter are the sides of the reaction vessel, therefore imposing heat and mass transport limitations. Slow reaction rates result.

Microchannel reactors reduce the size of conventional chemical reactors without lowering the throughput. The distance between heat generation and removal is reduced from tens of centimeters in conventional reactors to tens of microns ($\mu$) in microchannel reactors.

Microchannel reactors are fluidic devices that rely on embedded microstructures, of much smaller length scales (typically 500-1000 micrometers ($\mu m$)) than traditional systems, for their function. For thermal and chemical applications, small architecture and geometry provide the benefits of high rates of heat and mass transfer, large surface-to-volume ratios, and the opportunity of operating at elevated pressures. For other applications, small dimensions imply rapid response and compact design. The compact design is of value in space/weight sensitive applications such as transportation.

Further, unlike conventional chemical reactors, microchannel reactors number-up to process (not scale-up). In order to process larger volume of materials, channels are added to the reactor by either making the device larger, or by arranging multiple reactors in parallel. Potential applications of micro-reactors include, but are not limited to, heat exchangers, recuperators, heat-pumps, chemical separators, chemical reactors, fuel processing units, and combustors.

Microchannel reactors can be manufactured by the diffusion bonding of precision machined metallic foils or sheets. This method of manufacture is described in U.S. Pat. Nos. 5,811,062, awarded on Sep. 22, 1998; and 5,611,214, awarded on Jul. 29, 1997, respectively, both to R. S. Wegent et al.

The manufacture of microchannel reactors via diffusion bonding consists of three basic steps: forming, registration, and bonding. Forming consists of precision machining the internal features of the reactor in each foil. Machining can be accomplished through laser ablation, chemical machining, or mechanical methods such as punching or machining.

Registration is the alignment of each machined laminate in the appropriate sequence to produce the device having the desired internal architecture and flow-through characteristics.

Bonding is the joining of the registered stack of formed laminates to produce a sound device that allows for fluid flow without leaking. Joining of the registered stack can be accomplished by diffusion bonding, reactive bonding, or diffusion soldering techniques. Diffusion bonding and reactive bonding methods are accomplished by vacuum hot-pressing or Hot Isostatic Processing (HIP).

Diffusion bonding is a process by which two nominally flat interfaces can be joined at an elevated temperature (typically about 50%-90% of the absolute melting point of the parent material) using an applied pressure for a time ranging from a few minutes to a few hours. Diffusion bonding produces a monolithic joint through the formation of bonds at the atomic level, as a result of closure of the mating surfaces due to the local plastic deformation at elevated temperature, which aids interdiffusion at the surface layers of the materials being joined. It is generally a two-stage process. In the first stage, asperities on each of the surfaces deform plastically as pressure is applied. These asperities arise from the grinding or polishing marks that have been produced in the surface finishing stage. The microplastic deformation proceeds until the localised effective stress at the contact area becomes less than the yield strength of the material at the bonding temperature. As the deformation of asperities proceeds, more metal-to-metal contact is established. Typically, at the end of the first stage, the bonded area can be less than 10% with a large volume of voids remaining between localized bonded regions. In the second stage of bonding, thermally activated mechanisms (creep and diffusion) lead to void shrinkage and this increases further the bonded areas. For conventional joining of substance layers via diffusion bonding, the processing parameters (pressure, temperature, and time) are set to optimum values based on the strength of the bond one wishes to create between the components. Diffusion bonding of a component with a microchannel made by the precision machining of foils can be complicated by the embedded internal channel or feature.

Figure 1:
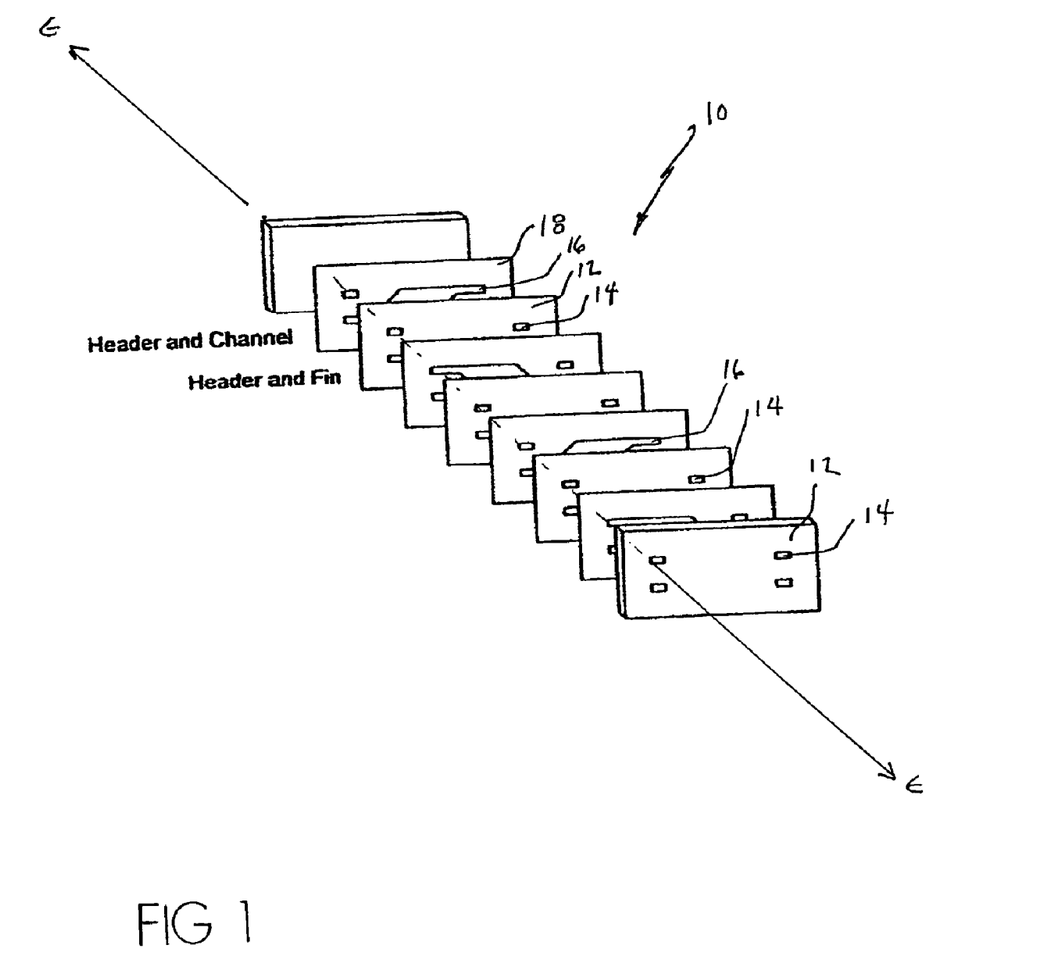
FIG. 1 is a schematic diagram of an exploded view of a registered stack of laminates for a heat exchange device comprising two fluid counter-flow microchannel arrays, in accordance with features of the present invention.

FIG. 1 is an exploded view of a registered stack of laminates, designated generally as numeral 10, before diffusion bonding. In this instance, the stack depicts a microlaminated two-fluid, interleaved, counterflow, microchannel array. A first set of alternating laminates 12, called fins define apertures 14. These apertures lie in registration with each other and with corresponding apertures 16 defined by a second set of intercalating laminates 18. This particular assembly facilitates fluid flow in opposite directions of two liquids whereby the two liquids never contact each other.

A heat exchanger of this general type, more particularly a multi-pass crossflow jet impingement heat exchanger is described in U.S. Pat. No. 5,016,707 awarded to Nguyen on May 21, 1991.

Figure 2:
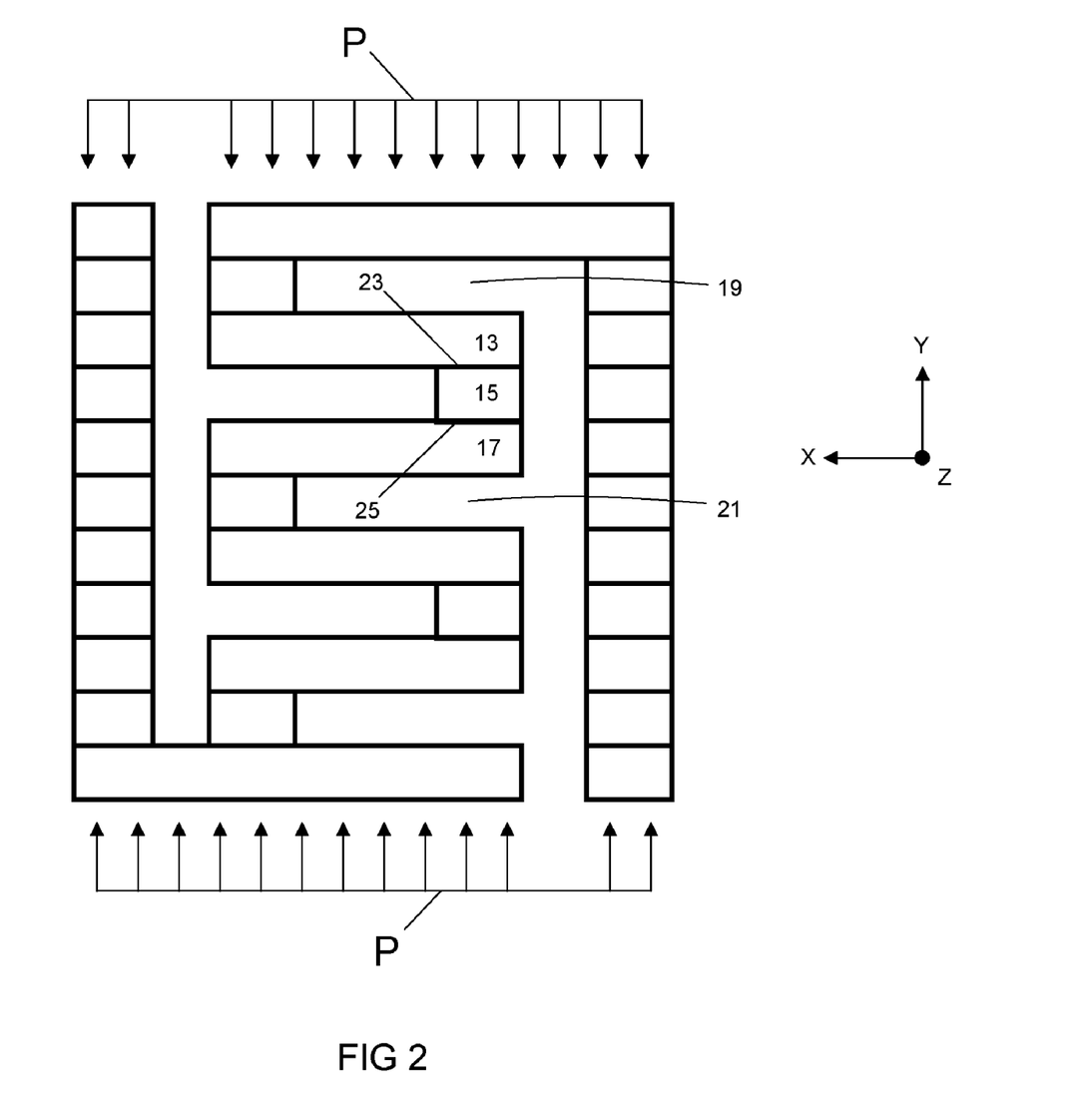
FIG. 2 is a schematic view of a two-fluid interleaved, counter-flow microchannel array comprised of microchannel and fin laminae which can be used to exchange heat between the two fluids, i.e., heat exchanger, in accordance with features of the present invention.
Figure 6:
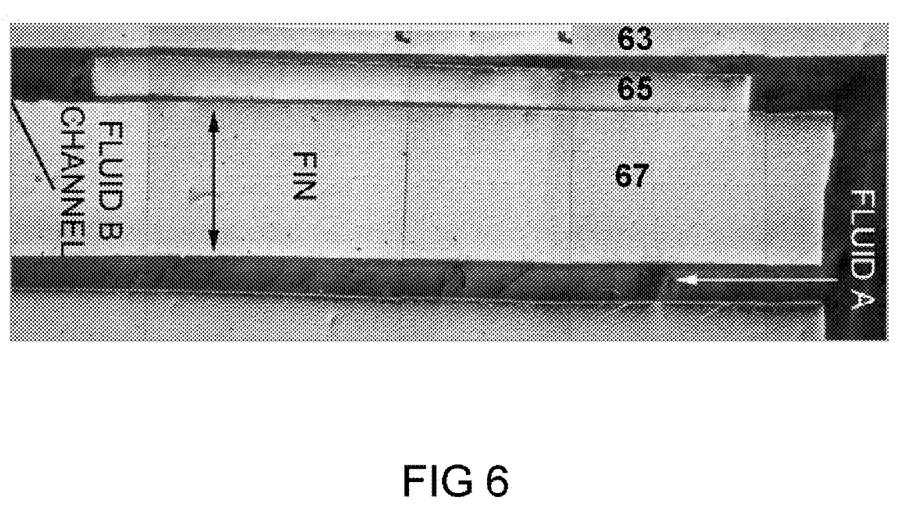
FIG. 6 is two-fluid interleaved, counter-flow microchannel array comprised of microchannel and fin laminae demonstrating poor bonding between adjacent laminae.

The diffusion bonding of a laminate stack relies on application of uniform uniaxial pressure to the laminate stack in a direction generally perpendicular to the planes in which the stacked laminates generally lie. FIG. 2 is a front schematic plan view of one such laminate stack, intended to produce a two-fluid interleaved, counter-flow microchannel array. Principal coordinate axes x, y, and z are also indicated for reference. The stacked laminates generally lie in the x-z plane, and uniaxial pressure P is applied in the direction of the y-axis. As illustrated in FIG. 2, the pressure P is transmitted through the stack via interfacial contact areas between adjacent laminae. Issues with the pressure transmission arise, however, when the internal geometry desired in the stack demands that gaps exists between certain adjacent laminae, such that some regions of individual laminae within the stack are unsupported by immediately adjacent laminae during the diffusion bonding. For example, the solid laminates 13, 15, and 17 shown at FIG. 2 positioned between gaps 19 and 21. Gaps 19 and 21 prevent the transmission of pressure P directly to the interfacial contact area 23, between solid laminates 13 and 15, and interfacial contact area 25, between solid laminates 15 and 17. Instead, the pressure felt at interfacial contact areas 23 and 25 is reliant on forces transmitted by solid laminates 13 and 17 over areas were solid laminates 13 and 17 are unsupported. This causes solid laminates 13 and 17 to experience bending moments, and reduces the pressure felt at interfacial contact areas 23 and 25. The pressure reduction can be significant for a situation such as that shown in FIG. 2, where the ultimate deflection of solid laminates 13 and 17 are constrained only by the elastic properties inherent in the laminae material. The situation represented in FIG. 2 is inevitable in the construction of cross-flow micro-channel heat exchangers. As a result, in the region where solid laminates 13, 15, and 17 are adjacent, the pressure felt at interfacial contact areas 23 and 25 is reduced and sufficient bonding between solid laminates 13, 15, and 17 may not occur. At a minimum, the strength of the bond formed at interfacial contact areas 23 and 25 is reduced due to increased porosity between laminates as a result of the locally reduced pressure. In the most egregious cases, the pressure reduction may be so severe that bonding in these regions does not occur at all. As an example, FIG. 6 illustrates a laminate stack similar to that shown at FIG. 2 and subjected to a uniaxial pressure for the purpose of diffusion bonding. As illustrated at FIG. 6, the uniaxial pressure applied has deformed the laminate stack to an extent where the interfacial contact areas between solid laminates 63 and 65 have experienced no diffusion bonding, and the interfacial contact area between solid laminates 65 and 67 are bonded inconsistently. A more complete explanation of this phenomenon is found in B. K. Paul, H. Hasan, J. S. Thomas, R. D. Wilson and D. Alman, *Limits On aspect Ratios In Two-Fluid Micro-Scale Heat Exchangers*, Transactions of NAMRI/SME, Gainesville, Fla., Vol. XXIX, 461-468 (2001) and incorporated herein by reference.

Realization of this low pressure problem has prompted fabricators to apply high pressures and temperatures. This sometimes distorts or collapses the spaces such as apertures and channels. The final result has been the production of devices with inferior flow properties.

Channel distortion is a function of the dimension of the width of the channel. The fin aspect ratio (channel width to fin lamina thickness) cannot exceed a certain value. The aspect ratio of concern is the aspect ratio of the fin that separates the channels. This ratio is defined as the distance that the fin is unsupported in the reactor design (the distance or length the fin is spanning the channel) divided by the thickness of the fin.

When producing micro-reactors via conventional hot-pressing, there is a limiting aspect ratio for a given uniaxial pressure which if exceeded will distort the fins and produce a structure which leaks or has poor fluid flow properties. Therefore, there will be some optimum balance between fin aspect ratio and the uniaxial pressure at which all lamina will uniformly and effectively bond. This is described in B. K. Paul, et al. supra. Paul describes the fundamental limit on the size of the internal feature which can be produced via diffusion bonding methods using a given uniaxial pressure, e.g., through hot-pressing. The optimum balance necessary either limits the size of the internal feature which can be produced through diffusion bonding of precision machined foils, or limits the uniaxial pressure which may be applied to produce adequate and uniform diffusion bonding, both of which may limit the performance characteristics of the micro-channel reactor.

The distortion can be avoided by the use of sacrificial cores and internal gaskets to provide support during the vacuum hot-pressing process. This method is described in U.S. Pat. No. 5,317,805 awarded to Hoopman et al., on Jun. 7, 1994, and U.S. Pat. No. 5,269,058 awarded to Wiggs et al., on Dec. 14, 1993.

U.S. Pat. No. 6,464,129 awarded to Stueber, et al. on Oct. 15, 2002 discloses a method for joining superalloy substrates using diffusion bonding. The method entails depositing an activator directly on the surface of the joint to be bonded without the use of a brazing alloy.

U.S. Pat. No. 6,129,261 awarded to Sanders on Oct. 10, 2000 discloses a method for compression diffusion bonding. The method entails the use of a Corrosion Resistant Steel (ORES) template to apply increased pressure in the areas designated for diffusion bonds.

U.S. Pat. No. 5,284,288 awarded to Woodward on Feb. 8, 1994 discloses a method for the manufacturing of an article by diffusion bonding. The method includes the use of welding to weld edges of metal sheets together, and a stop off material on surfaces to prevent diffusion bonding at predetermined positions. The binder in the stop off material is subsequently removed.

U.S. patent application Ser. No. 10/576,963 by Paul, et al, filed Oct. 25, 2004, discusses a pre-bonding step wherein sub-sections of laminae prone to warpage and channel collapse are tack-bonded prior to application of full uniaxial diffusion bonding pressure to the entire stack. Paul indicates the pre-bonding step may be a diffusion bonding at low pressure, resistance spot welding, or other techniques. The purpose of the pre-bonding technique is to ensure that all areas of adjacent laminae in the sub-section experience intimate contact during the subsequent application of uniaxial pressure for final bonding of the entire stack. This approach may alleviate issues of unconstrained bending leading to incomplete bonding as a result of inadequate contact, however in the application of subsequent uniaxial pressure, non-uniform pressure gradients across unsupported internal laminate spans still occur and inadequate and/or non-uniform bonding may still result in some regions.

A need exists in the art for a graduated diffusion bonding process which provides for the application of uniform pressure to all regions of a stacked laminae during final bonding while maintaining an intimate contact at interfacial contact areas, such that all regions in the stacked laminae experience substantially the same temperature and pressure conditions during final bonding, thereby producing substantially uniform bond strength at interfacial contact areas throughout the laminae stack. Such a process should prevent collapse of internal, embedded features during conversion of a laminate stack into a monolith structure. The process should obviate the need for sacrificial cores, internal gaskets, templates, brazing alloys, or binders. Also, the process should not limit the size of the embedded internal features of the article being manufactured.

Thus, it is an object of the present disclosure to provide a method for producing components with internal architectures which overcomes many advantages of the prior art.

It is another object of the present disclosure to provide a process for producing monoliths having internal structures which maintain their configuration during fabrication of the monoliths. A feature of the invention is the application of a graduated diffusion bonding process. An advantage of the invention is that the process maximizes monolith density and minimizes leaking of fluid from within the various internal structures.

It is another object of the present disclosure to provide a process for formation of microstructures, such as microchannels which do not experience any significant distortion during processing. A feature of the invention is a graduated application of diffusion bonding to layers of substance such that the layers are initially weakly bonded together before further treatment. An advantage of this invention is that fluid flow characteristics through channels is not degraded by the distortion of the channels from processing. An additional advantage of the invention is that pores and unintentional voids present in the laminates are greatly diminished.

It is another object of the present disclosure to provide a process which can create a properly sealed solid article via diffusion bonding. A feature of the invention is that during initial steps of the process, a combination of lower pressure (as low as 100 pounds per square inch (psi)), lower temperature (as low as $T_h$=0.4; $T_h$=homologous temperature: process Kelvin temperature divided by Kelvin melting temperature of the material), and shorter time periods (as short as 0.25 hour (hr)) than in conventional one-step hot-pressing diffusion bonding methods is used. An advantage of this feature is that it allows for prebonding of the laminates in regions adjacent to the embedded features while also providing a means for preventing collapse or distortion of those regions.

It is another object of the present disclosure to provide a process for diffusion bonding of laminae arranged in registration, during which the embedded features such as channels do not collapse. A feature of the invention is the use of very high pressure during processing steps (as high as 30 ksi (30,000 psi)) which keeps channels intact due to their being pressurized by the high pressure itself. Another feature of the present invention is that there is no limiting aspect ratio requirements of fin laminae that separates channel laminae. An advantage of this feature is that supplementary materials such as sacrificial cores, internal gaskets, and templates are not used, thus lowering costs.

It is another object of the present disclosure to provide a process which maximizes processing efficiency of diffusion bonding and structural integrity of the device being made. A feature of the invention is that a uniaxial low pressure step, then a isostatic high pressure step can be performed entirely within an HIP apparatus. An advantage of this feature is the elimination of steps that are otherwise normally required for cooling of the pre-bonded laminae stack and moving the stack between different and separate apparati for the two steps. This leads to greater efficiency of the two-step process and lower costs.

SUMMARY OF THE INVENTION

The present disclosure provides a process for making components through the diffusion bonding of stacked laminae, where the internal geometry of the component demands that some regions of individual laminates within the stack are unsupported by immediately adjacent laminae during the diffusion bonding. The process comprises supplying a plurality of generally flat laminae which, when stacked together, form a component having an exterior and having internal features in fluid communication with the exterior, the internal features formed by regions of individual laminates which are unsupported by immediately adjacent laminae, subjecting the component to a low uniaxial pressure applied in a direction substantially perpendicular to the planer surfaces of the laminae at a first temperature and for a first time period sufficient to cause initial diffusion bonding and resultant pore isolation at interfacial contact areas throughout the laminate stack, then subjecting the component to a higher isostatic pressure at a second temperature, thereby applying uniform pressure to both the exterior and the internal features, for a second time period sufficient to collapse the isolated pores in the interfacial contact areas, thereby producing a component from stacked laminates having uniform bond strength and uniform porosity at interfacial contact areas throughout the laminate stack while avoiding lamina deflection and deformation of the internal voids and channels.

The present disclosure thereby provides a micro-chemical reactor (or micro-heat exchanger) comprised of a plurality of laminae held in registration in which there is no limit on the aspect ratio of the fin laminae that separates the channel laminae.

BRIEF DESCRIPTION OF THE DRAWINGS

The invention together with the above and other objects and advantages will be best understood from the following detailed description of the preferred embodiment of the invention shown in the accompanying drawings, wherein.

DESCRIPTION OF INVENTION

The method herein provides a two step process for diffusion bonding laminates such that the final assembled construct comprises a robust structure containing internal voids and channels. The internal voids and channels are in fluid communication with the exterior of the structure and serve as a means for providing heat exchange to a plurality of fluids passing through separate pathways within the construct. The voids and channels also provide reaction surfaces for the fluids passing through the voids and channels. The method involves a graduated diffusion bonding process wherein a uniaxial pressure is utilized at a first temperature and for a first time to provide initial diffusion bonding at interfacial contact areas throughout the laminate stack. The uniaxial pressure is low relative to a typical uniaxial pressure which would be applied at the first temperature and the first time for complete diffusion bonding. As a result, following the uniaxial pressure, the interfacial contact areas where initial diffusion bonding has occurred may have reduced bond strength and higher porosity throughout the laminate stack than would be produced using the typical uniaxial pressure. The intent of the uniaxial pressure at the first temperature and for the first time is to bring opposing surface asperities in the interfacial contact areas into contact to provide initial diffusion bonding at the interfacial contact areas while avoiding deflection of individual laminates in regions that are unsupported by immediately adjacent laminae. Application of the uniaxial pressure produces a degree of diffusion bonding such that the interfacial contact areas throughout the laminate stack have localized bonded regions at contacting surface asperities and a large volume of voids remaining between the localized bonded regions. Following the uniaxial pressure, an isostatic pressure is applied at a second temperature for a second time for final bonding. The isostatic pressure provides a uniform pressure acting on the exterior of the construct and acting isostatically within the internal voids and channels in fluid communication with the exterior, such that a uniform pressure gradient is established on all laminae surfaces exposed within the internal voids and channels and thermally activated mechanisms such as creep and diffusion lead to void shrinkage, further increasing the bonding area at the interfacial contact areas. This combination produces a component having uniform bond strength and uniform porosity between adjacent laminae throughout the laminae stack. The method thereby discloses a coordinated approach to the production of components using stacked laminates, wherein Step I applies uniaxial pressure to isolate substantially all the pores in interfacial contact areas from the interior surfaces defining the interior voids and channels, such that during Step II, higher pressure may be applied isostatically to further reduce the porosity in interfacial contact areas while avoiding lamina deflection, thereby producing a component having uniform bond strength and uniform porosity between adjacent laminae throughout the laminae stack without deformation of the interior voids and channels.

As used herein, the term "uniaxial pressure" refers to pressure having magnitude along a single principal axis in a three dimensional Cartesian coordinate system and having substantially zero magnitude along the remaining two principal axes in the three dimensional Cartesian coordinate system, where the single principal axis is generally orthogonal to the planer surfaces of the laminae. For example, that pressure exerted by a hot press producing uniaxial pressure P generally in a direction parallel to the y-axis as depicted in FIG. 2.

As used herein, the term "isostatic pressure" refers to pressure having equal magnitude along three principal axes, such that force applied to a unit area of a surface has equivalent magnitude regardless of the spatial orientation of the surface relative to the three principal axes. For example, that pressure exerted by a gas.

As used herein, the term "interfacial contact area" refers to a two-dimensional Euclidian space existing at the plane of the facial interface between two generally flat laminates in a laminate stack when the laminate stack is registered and not experiencing a uniaxial pressure load. For example, the two-dimensional Euclidian space described as interfacial contact area 23 existing in the x-z plane between laminates 13 and 15, or similarly interfacial contact area 25 between laminates 15 and 17, as depicted in FIG. 2.

As used herein, the term "initial bonding" refers to diffusion bonding at least between asperities in interfacial contact areas throughout a laminate stack under a uniaxial pressure at a temperature and for a time, where the uniaxial pressure at a temperature and for a time brings opposing surface asperities at the interfacial contact areas into contact while avoiding deformation of individual laminates that preclude diffusion bonding at least between asperities in interfacial contact areas, and where the bond strength and porosity of the diffusion bonds following initial bonding may be insufficient for the operating conditions of a component formed with the laminate stack, for example, a microchannel reactor.

As used herein, the term "final bonding" refers to diffusion bonding that occurs following initial bonding of interfacial contact areas within a laminate stack under an isostatic pressure at a temperature and for a time, where the bond strength and porosity of the diffusion bonds at interfacial contact areas throughout the laminate stack following final bonding are sufficient for the operating conditions of a component formed with the laminate stack, for example, a microchannel reactor.

The invented method involves the application of Hot Isostatic Processing (HIPing). HIPing is a process by which parts or components are placed in a pressure furnace with inert gas and heated to high temperatures. The nature of the assembled component to be processed is such that certain internal surfaces and regions of the component are in fluid communication with the exterior of the component and its surroundings. As such, the surfaces defining the internal structures are in hydrostatic equilibrium with the external environment of the component being produced.

HIPing calls for placing parts in a furnace inside a large pressure vessel and increasing argon pressure up to as high as 30,000 psi, and typically from 15,000 psi (15 ksi/103 MegaPascals (MPa)) to 25,000 psi (25 ksi/172 MPa) when the metal is at high temperature. Generally then, HIPing employs hot isostatic pressure, to change material to a "plastic state" thereby removing internal porosity and collapsing any unintended voids.

HIPing can be used to join metal to metal; ceramics to metals; and composites to other metals. HIPing can use solid and/or powder materials. An advantage of HIPing is its ability to simultaneously densify and bond parts in close spatial relationship to each other. The result is seamless grain structure at the materials' interface.

Generally, HIPing has a much lower processing temperature than other methods and operates at final temperatures of about 50% to 70% of a laminate material's melting point temperature. HIPing apparati such as the inventors' (QIH-9 Hot Isostatic Press, Flow Autoclave Systems, Columbus, Ohio) are factory-programmed to allow raising the temperature and/or pressure from one preset value to another. Accordingly, temperature and pressure changes can be made simultaneously.

The inventors have devised a new process for the diffusion bonding of laminates that displays several unique features including an ability to bond laminates regardless of the fin aspect ratio.

A salient feature of the invention is that the process uses a plurality of steps (usually two steps) as opposed to the conventional one step process of current laminate diffusion bonding methods. Initially, a plurality of laminates is supplied. These laminates are configured so that when assembled together in registration, planar surfaces of each of the laminates oppose and contact the planar surfaces of adjacent laminates at interfacial contact areas such that the final construct defines an exterior surface having a predetermined geometric shape and interior voids and channels having predetermined geometric shapes. Typically, the laminates are machined with internal features so that when the laminates are assembled in the proper registration the device defines internal voids and/or channels.

The loosely held construct, resembling a laminate stack, is subjected to a first uniaxial positive pressure orthogonal to the planer surfaces of the laminae at a first temperature and for a first time period. The uniaxial pressure is low relative to the typical uniaxial pressure which would be applied at the first temperature and the first time for complete diffusion bonding. This use of a lower uniaxial pressure serves to minimize deflection of individual laminates which are unsupported by immediately adjacent laminae, thereby maintaining sufficient conditions for initial diffusion bonding to weakly or loosely bond all adjacent surfaces at interfacial contact areas throughout the laminate stack. "Weakly" and "loosely" (supra) mean a low tensile strength of the bond between the foils, for example, a bond strength as low as 1 MPa. In this first step (Step I), the uniaxial pressure can be applied mechanically, as in a vacuum hot-press. This initial bonding process ensures weak diffusion bonding at interfacial contact areas at least between opposing asperities throughout the laminate stack, and isolates substantially all the pores remaining in interfacial contact areas from the interior surfaces defining the internal voids and channels. This pore isolation serves as a hermetic seal preventing seepage of isolation pressure into the pores from the internal voids and channels, which would act to prevent subsequent pore collapse during the second step of processing. Step I then, with its weak diffusion bonding between opposing asperities of adjacent laminae, ensures that the subsequent bonding processes, defined as Step II, will be facilitated. The pressure range, for step 1 is from about 1 MPa to 100 MPa.

After the above-discussed prebonding process, the stack of laminates is subjected to Step II, i.e., an isostatic pressure and a second temperature for a second time period. Generally, the second isostatic pressure is of greater magnitude, in terms of force per unit area, than the uniaxial pressure, and similarly, the second temperature is greater than the first temperature. Usually, temperatures of 50 to 70 percent of the melting point temperature of the laminates is sufficient. Application of the isostatic pressure, second temperature, and second time period act to collapse remaining pores at interfacial contact areas, thereby increasing surface contact and producing final bonding between adjacent laminates at the interfacial contact area. Final bonding occurs through the mechanism of atomic or molecular diffusion across interfaces of adjacent laminae, resulting in the formation of a single, solid, monolith-like structure. The final bonding strength is determined by the second set of conditions. Generally, the higher the pressure and temperature applied, the stronger the bond. For Step II, the range is from 100 MPa to the yield strength of the material in question.

In this second step (Step II), preferably, the pressure is delivered isostatically via a gas, such as in an HIP chamber. In Step II, the gas flows into the interior voids and channels thereby applying uniform pressure throughout the construct on the interior surfaces defining the interior voids and channels. This allows application of the higher pressures needed for higher bond strengths, and does so in a manner not dependent on force transmission solely through interfacial contact areas. As such, the isostatic gas pressure provides a uniform pressure profile on both the exterior of the laminate stack and on those sections of individual laminates defining the internal voids and channels, including the regions of individual laminates which are unsupported by immediately adjacent laminae. This allows application of high pressure and high temperature such that thermally activated mechanisms such as creep and diffusion lead to void shrinkage and final bonding in the interfacial contact areas, but does so in manner, following Step I, that avoids lamina deflection and resulting deformation of the internal voids and channels. This produces a sound, robust component having uniform bond strength and uniform porosity between adjacent laminae throughout the laminae stack. As noted supra, Step I isolates substantially all the pores remaining between adjacent laminae from the interior surfaces defining the interior voids and channels such that, during Step II, permeation of the gas into the pores does not prevent final bonding between adjacent laminae.

As noted supra, in diffusion bonding processes, the parameters of pressure, temperature, and time are set to optimum values based on the strength of the bond desired. The method as described herein allows application of high pressures and temperatures to a laminate stack by utilizing uniaxial pressure in such a manner that subsequent isostatic pressure may be applied for high bond strength diffusion bonding of laminates at interfacial contact areas without deformation to the laminate stack. The method discloses a coordinated approach to the production of components using stacked laminates, wherein Step I applies uniaxial pressure to isolate substantially all the pores in interfacial contact areas from the interior surfaces defining the interior voids and channels, such that during Step II, higher pressure may be applied isostatically to provides uniform force application per unit surface area, preventing lamina deflection and completes the final stages of diffusion bonding by greatly reducing the porosity between adjacent laminae.

Surprisingly and unexpectedly, the inventors have found that the invented process allows for the production of embedded channels that exceed the foil distortion limit described by Paul et al. supra. The inventors have also found that the invention's characteristics do not effect a limitation on the size of the embedded internal features of the article being manufactured.

In addition, the inventors have found that the pressure and temperature of the conditions of Step I are advantageous inasmuch the conditions are milder than those of conventional one-step diffusion bonding methods. Generally, conditions of the initial bonding step include a combination of lower pressure (as low as 100 pounds per square inch (psi)), lower temperature (as low as $T_h=0.4$; $T_h$=homologous temperature: process Kelvin temperature divided by Kelvin melting temperature of the material), and shorter time periods (as short as 0.25 hour (hr)) compared to conventional one-step hot-pressing diffusion bonding methods widely used.

Figure 7:
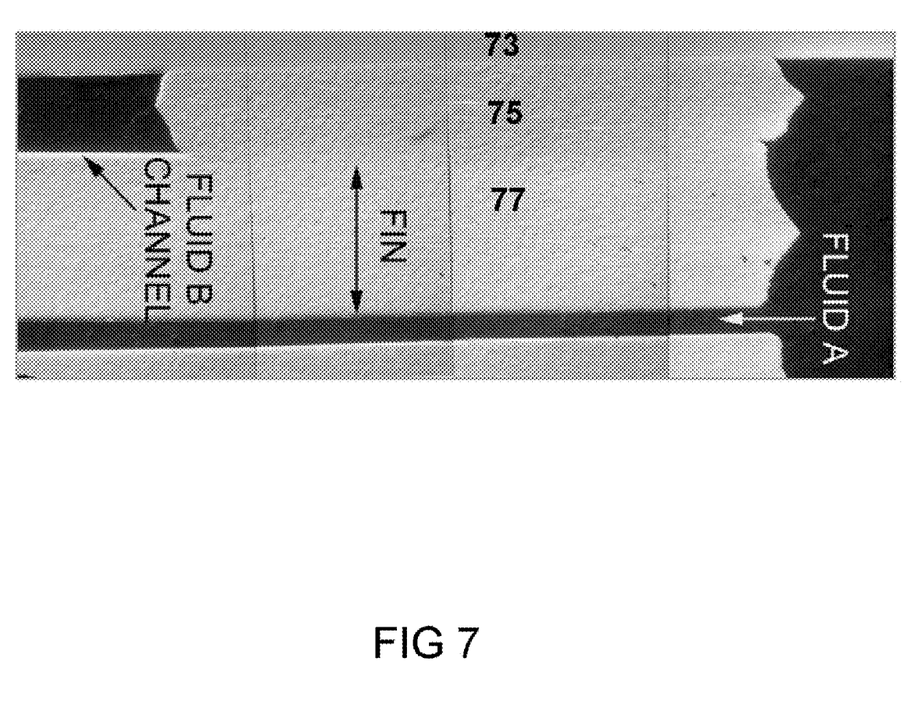
FIG. 7 is two-fluid interleaved, counter-flow microchannel array comprised of microchannel and fin laminae demonstrating good bonding between adjacent laminae.

This milder set of conditions allows for initial bonding of the laminates in interfacial contact areas throughout the laminate stack, including regions adjacent to the embedded features in areas such as the fluid channel in FIG. 2 supra while substantially preventing the collapse or distortion of those regions, producing bonding at interfacial contact areas similar to that shown at FIG. 7. FIG. 7 illustrates the situation expected for initial bonding using a low uniaxial pressure followed by final bonding using a higher isostatic pressure, such that deformation of the laminate stack is avoided and bonding at interfacial contact areas between solid laminates 73, 75, and 77 is consistent.

During Step II, the more stringent conditions of the second isostatic positive pressure give support to the features embedded in the laminae stack so as to prevent the collapse or distortion of those features which would otherwise occur. This allows for the use of temperatures in excess of 1000° C. Generally, given the unhindered fluid communication between the interior surfaces of the component and its exterior, the positive pressure serves as a means to mechanically support the internal structure during heating.

The size of internal features and structures is limited only by the available thickness of sheet and foils. Microfoils are presently available in thicknesses as thin as 0.0005 inch (in) (0.0127 millimeters (mm)/12.7 µm). As such, structures employing these foil thicknesses will have internal cavities of similar dimensions.

The invented process works well with any value of the fin aspect ratio.

The inventors have also found that the invented process does not require sacrificial cores, internal gaskets, templates, brazing alloys, or binders. The formed laminates are simply registered and subsequently subjected to the invented graduated HIP process.

The process allows for the fabrication of seamless monolith structures containing internal voids and channels which, when compared to state-of-the-art structures, feature extremely small void/channel dimensions. Exemplary dimensions are where the internal structures are less than 500 microns in height or in cross section and the laminates that separate the channels are less than 500 microns thick.

A myriad of substances can be used as candidates for components of the laminate construct. Generally, suitable substances are those capable of being configured as a sheet, foil, shim, plate, dense powder tape, or any combination thereof, and in final thicknesses to achieve the desired volumes of the internal voids of the laminate constructs. Typical feedstock configurations include metal foils, polymeric films, and dense powder tapes. (A dense powder tape is a sheet produced from powders that are sintered and processed to near full density—i.e., substantially no porosity.) The method is well suited for use with any metal or metallic alloys, including, but not limited to, nickel (Ni), iron (Fe), titanium (Ti), zirconium (Zr), niobium, (Nb), tantalum (Ta), and aluminum (Al) that can be formed into foil, sheet, plate, or any combination thereof.

The uniaxial pressure ranges from about 0.25 ksi to 5 ksi. The isostatic pressure ranges from about 1 ksi to 30 ksi.

During Step I, heat is applied at a temperature and for a time sufficient to facilitate initial bonding at interfacial contact areas throughout the laminate stack, including interfacial contact areas near internal voids and channels. A suitable temperature is 30 percent to 60 percent (i.e. 0.3 to 0.6) of the absolute melting point temperature of a material.

Higher temperatures are utilized during the subsequent, second processing step to facilitate final bonding of interfacial contact areas, while simultaneously maintaining the configuration and volumes of the internal structures by subjecting the voids defining those internal structures with inert gas at predetermined pressures. Suitable temperatures for the second processing step range from about 0.6 to 0.9 of the absolute melting point of the material.

For a typical austenitic stainless steel, the first temperature ranges from about 400° C. to 700° C. For the same steel, the second temperature ranges from about 700° C. to 1200° C.

The uniaxial pressure is applied during a time span with a range of 0.25 hr to 4 hrs. The isostatic pressure is applied during a time span with a range of 0.5 hr to 4 hrs. The first temperature is applied during a time span with a range of 0.25 hr to 4 hr. The second temperature is applied during a time span with a range of 0.5 hr to 4 hr.

Figure 3:
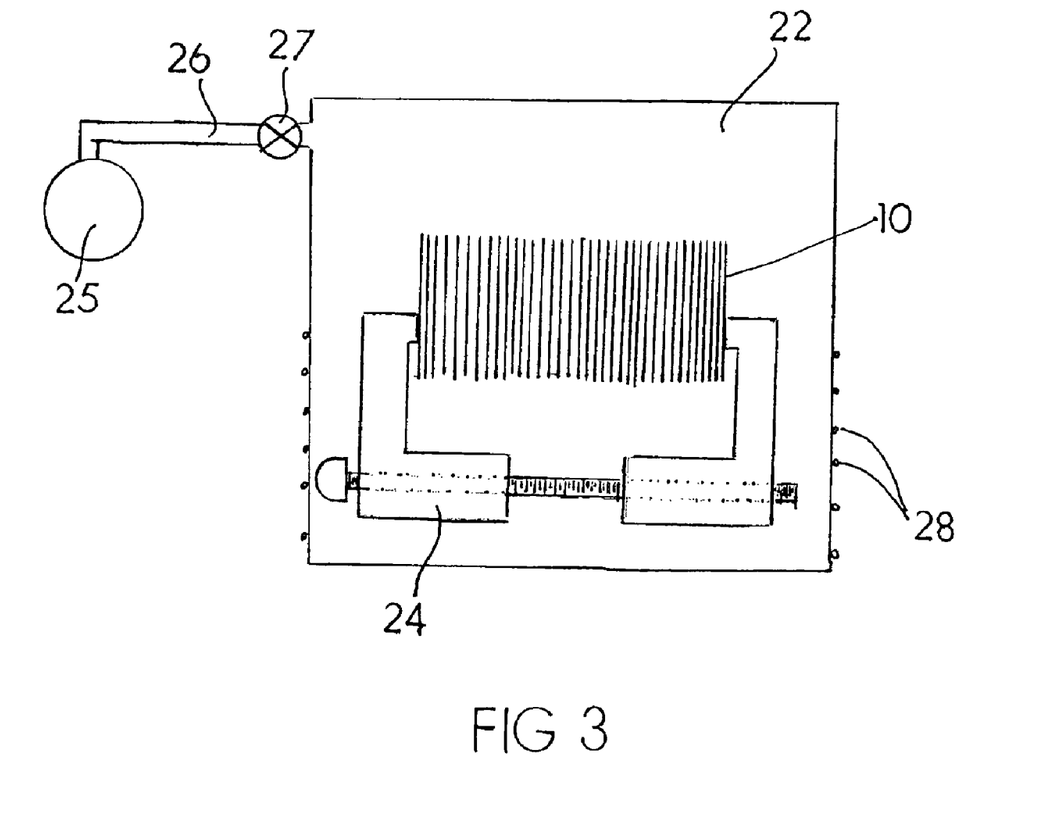
FIG. 3 is a schematic diagram of an HIP reaction chamber containing registered laminate sheets, in accordance with features of the present invention.

A vacuum hot press can be used for the conditions of Step I whereas an HIP is used for the conditions of Step II. Alternatively, an HIP may be used for both conditions. Use of a HIP for both steps allows for greater efficiency in processing as there is no need to allow for cooling of the stack and subsequent transfer to another apparatus. A fixturing device providing sufficient uniaxial pressure at the conditions of Step I can be machined to allow for the initial bonding step to occur in an HIP reaction chamber. The fixturing device is not required for Step II, since the initial bonding in Step I will fix the registering of the laminates. The registered laminates would be mounted in the fixturing device placed within the HIP chamber. An exemplary scenario is depicted in FIG. 3.

Generally, a suitable reaction chamber 22 (FIG. 3) is adapted to receive a fixturing device 24, loaded with a stack of registered laminates 10. A region of the chamber 22 defines a fluid aperture 26 through which inert gas is pumped so as to establish an controlled atmosphere within the chamber 22. The aperture 26 contains a means 27 for regulating fluid flow (such as a valve) in and out of the chamber.

Positive pressure within the chamber 22 is produced using a gas 25 that is inert relative to the materials being processed. Typical gas candidates include, but are not limited to, argon (Ar), nitrogen ($N_2$), helium (He), krypton (Kr), and xenon (Xe). The gas, prior to entering the chamber, may be heated to the desired Step I or Step II temperatures. Alternatively, a means for heating the entire chamber, such as heating coils 28, is provided. During Step II, the fixturing device may remain intact, provided the pressure and temperature conditions utilized during Step II do not result in the fixturing device applying uniaxial pressure sufficient to deform the final bonded laminate stack due to, for example, thermal expansion characteristics.

Test Samples

Test samples were fabricated from 347 stainless steel foils (0.001 in thickness). Each sample comprised a single embedded channel of dimensions 1 in×0.25 in×0.001 in (for measuring fluid flow properties) and a double lap-joint tensile bar (for measuring bond strength between the foils). Three test samples were prepared using conventional hot pressing techniques only, while the fourth sample was prepared according to the method disclosed herein. Comparison of bond strengths and fluid flow properties between the first three samples and the fourth sample illustrate the advantages of the method disclosed herein.

Figure 4:
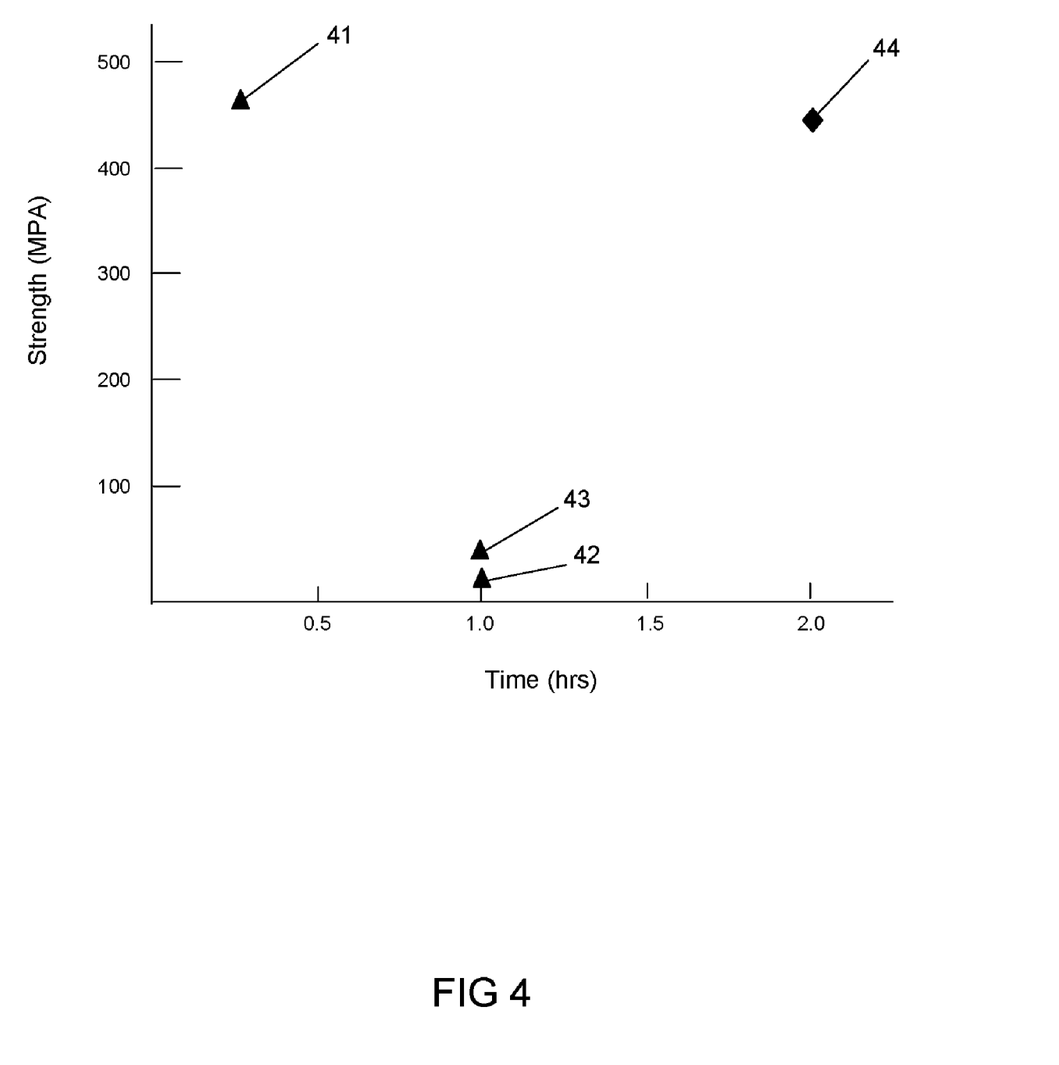
FIG. 4 is a plot of bond strength in MPa for bonded 347-type stainless steel foils, comparing diffusion bonding using uniaxial pressure versus diffusion bonding in accordance with features of the present invention.

Sample 1 was prepared by hot-pressing at 1050° C. and 0.25 ksi for 0.25 hours. Sample 2 was prepared by hot-pressing at 750° C. and 0.5. ksi for 1.0 hours. Sample 3 was prepared by hot-pressing at 750° C. and 1.0 ksi for 1.0 hours. Resulting bond strengths versus process times for samples 1, 2, and 3 are illustrated at FIG. 4. as points 41, 42, and 43 respectively.

Figure 5:
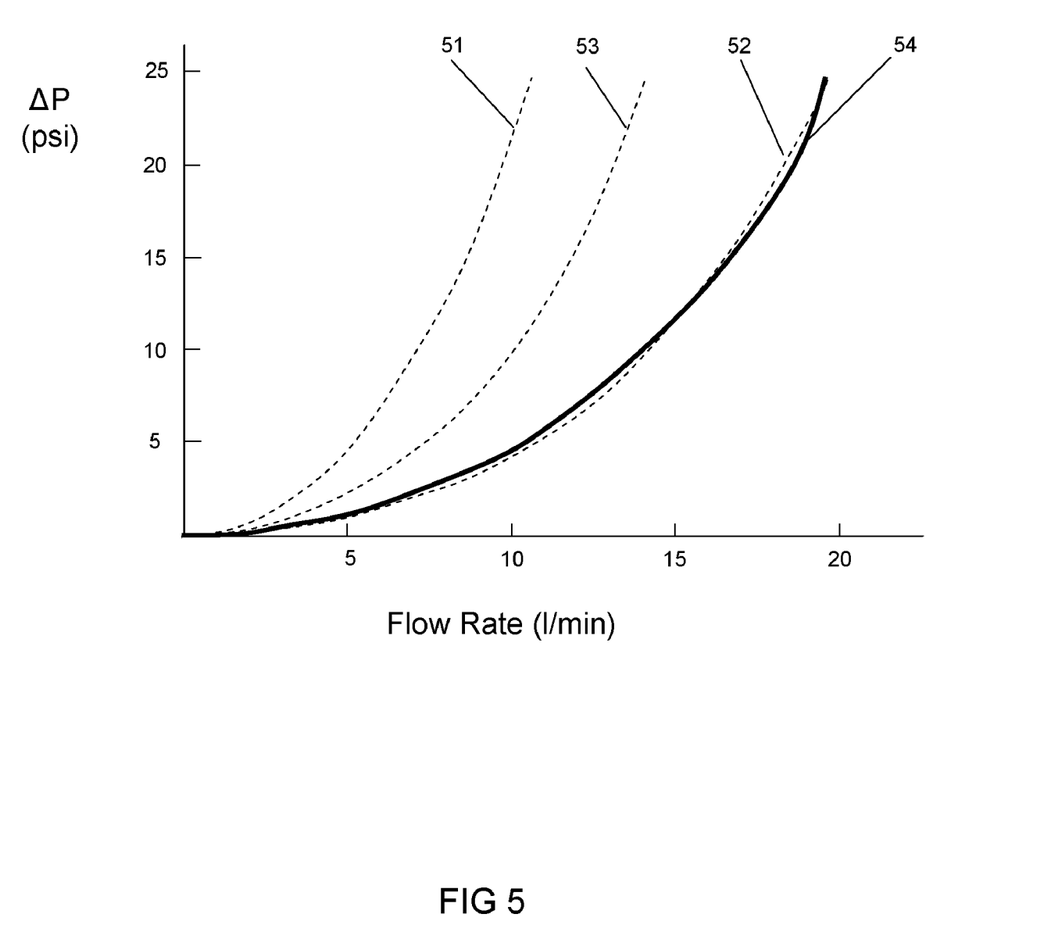
FIG. 5 is a plot of pressure drop through a microchannel in psi as a function of flow rate through the microchannel in liters per minute (l/min) of air at a delivery pressure of 60 psi, comparing the flow characteristics of uniaxial diffusion bonded laminates stacks versus a laminate stack diffusion bonding in accordance with features of the present invention.

FIG. 5 is a plot of pressure drop in pounds per square inch (psi) as a function of flow rate in liters per minute (l/min) through a single embedded microchannel. The data displayed is for air at a delivery pressure of 60 psi. Data for samples 1, 2, and 3 are illustrated at FIG. 5. as dashed line curves 51, 52, and 53 respectively. A higher pressure drop indicates a partially collapsed or constricted micro-channel. As illustrated with FIGS. 4 and 5, sample 1 show µµs the highest bond strength 41, but also the greatest pressure drop for a given flow rate at 51, indicating the greatest degree of channel deformation incurred during the hot-press process. Sample 2 indicates a significantly improved flow characteristic at 52, but at a greatly reduced bond strength 42 as indicated at FIG. 4. Sample 3, with application of a greater uniaxial pressure as compared to Sample 2, shows some improvement in bond strength 43 at FIG. 4, but the flow characteristic 53 at FIG. 5 is significantly impacted.

The fourth sample was produced using an embodiment of the method disclosed herein. The fourth sample was produced by first vacuum hot-pressing precision machined foils of 347 stainless steel at a temperature of 750° C. and a pressure of 0.5 ksi for a period of 1 hr with subsequent HIPing of the resultant initially bonded structure at a temperature of 1200° C. and a pressure of 10 ksi for a period of 1 hr. The bond strength of the fourth sample is shown as 44 at FIG. 4. The flow characteristic is shown as solid line 54 at FIG. 5. As illustrated, the hot-pressed+HIPed fourth sample displayed a high bond strength 44 comparable to bond strength 41 between the foils while manifesting a low pressure drop 54 for fluid flow. This indicates high strength bonding with minimal deformation of the flow channel as a result of the processing method disclosed herein.

The relatively small pressure drop of the hot-pressed+HIPed sample supra means there is little or no collapse of the channel as a result of the two-step process, the first step comprising vacuum hot-pressing for prebonding and the second step comprising HIP. By contrast, the samples produced using conventional vacuum hot-pressed processes suffered distortion or partial collapse of their channels. This shows that the invented process produces a robust article without sacrificing fluid flow properties through its microchannels.

The process creates a properly sealed solid article via diffusion bonding.

The invented process works well with any value of the fin aspect ratio.

Porosities of materials in microstructures are greatly diminished.

Performance of both steps of the invented process entirely within a HIP apparatus gives greater efficiency of the two-step process and lower costs.

Potential applications of the invented process include the fabrication of micro-channel devices such as heat exchangers, recuperators, heat-pumps, chemical separators, chemical reactors, fuel processing units, and combustors.

While the invention has been described with reference to details of the illustrated embodiments, these details are not intended to limit the scope of the invention as defined in the appended claims.

What is claimed is:

1. A process for making components having internal voids and channels in fluid communication with the exterior of the component using diffusion bonding of stacked and registered laminates, the process comprising:

a) forming a laminate stack by stacking and registering a plurality of laminates in a predetermined order, thereby establishing interfacial contact areas within the laminate stack and a thereby establishing a laminate stack exterior, such that the plurality of laminates define internal voids and channels within the laminate stack in fluid communication with the laminate stack exterior, and such that the laminate stack exterior is comprised of a top face and a bottom face, where the top face and the bottom face are parallel to the interfacial contact areas within the laminate stack;

b) applying a uniaxial pressure to the top face and the bottom face, where the uniaxial pressure has a single principal axis and the single principal axis is perpendicular to the top face and the bottom face, such that the uniaxial pressure acts to compress the laminate stack along the single principal axis, and maintaining the uniaxial pressure while subjecting the laminate stack to a first time such that initial bonding occurs at the interfacial contact areas, thereby producing an initially bonded laminate stack; and c) applying an isostatic pressure to the initially bonded laminate stack while subjecting the initially bonded laminate stack to a second temperature and for a second time such that final bonding occurs at the interfacial contact areas, thereby forming a component having internal voids and features in fluid communication with the exterior of the component.

2. The process recited in claim 1 wherein an individual laminate within the plurality of laminates has a surface asperity and asperities, and wherein the initially bonded laminate stack is diffusion bonded at least between some portion of asperities in the interfacial contact areas within the laminate stack.

3. The process recited in claim 1 wherein the second temperature is higher than the first temperature.

4. The process as recited in claim 1 wherein the isostatic pressure is greater than the uniaxial pressure.

5. The process as recited in claim 1 wherein the first temperature ranges from about 30 percent to 60 percent of the absolute melting point temperature of the plurality of laminates.

6. The process as recited in claim 1 wherein the second temperature ranges from about 60 percent to 90 percent of the absolute melting point temperature of the plurality of laminates.

7. The process as recited in claim 1 wherein the uniaxial pressure is applied using a fixturing device loaded with the plurality of laminates and placed in a hot isostatic press, and the isostatic pressure is applied using the hot isostatic press.

8. The process as recited in claim 1 wherein at least one laminate in the laminate stack has a region unsupported by the interfacial contact areas within the laminate stack.

9. The process as recited in claim 1 wherein at least one laminate in the laminate stack has a thickness less than or equal to 500 microns, and wherein the internal voids and channels within the laminate stack have a height dimension perpendicular to the planer surfaces of the plurality of laminates and the height dimension is less than or equal to 500 microns.

10. The process as recited in claim 1 wherein the wherein the plurality of laminates are formed from metal or metallic alloys.

11. The process as recited in claim 10 wherein the metal or metallic alloys are comprised of one or more of nickel, iron, titanium, zirconium, niobium, tantalum, or aluminum.

12. The process as recited in claim 1 wherein the uniaxial pressure is from about 0.25 ksi to about 5 ksi and the first time is from about 0.25 hours to about 4.0 hours.

13. The process as recited in claim 1 wherein the isostatic pressure is from about 1 ksi to about 30 ksi and the second time is from about 0.5 hours to about 4.0 hours.

14. The process as recited in claim 1 wherein the isostatic pressure is produced using a gas that is chemically inert relative to the plurality of laminates.

15. The process as recited in claim 1 wherein the plurality of laminates are formed from a plastic forming material selected from the group consisting of metal foils, polymeric films, powders, dense powder tapes, and combinations thereof.

16. The process recited in claim 1 wherein the isostatic pressure and the second temperature and the second time produces diffusion bonding in interfacial contact areas having sufficient strength for the expected operating conditions of the component.

17. The process as recited in claim 1 where the uniaxial pressure to the top face and the bottom face is applied with a clamp or a ram press oriented with respect to the laminate stack to compress the laminate stack along the single principal axis.

18. A process for making components having internal voids and channels in fluid communication with the exterior of the component using diffusion bonding of stacked and registered laminates, the process comprising:
   a) forming a laminate stack by stacking and registering a plurality of laminates in a predetermined order, where an individual laminate within the plurality of laminates has a surface asperity and asperities, thereby establishing interfacial contact areas within the laminate stack and a thereby establishing a laminate stack exterior, such that the plurality of laminates define internal voids and channels within the laminate stack in fluid communication with the laminate stack exterior, and such that the laminate stack exterior is comprised of a top face and a bottom face, where the top face and the bottom face are parallel to the interfacial contact areas within the laminate stack;
   b) applying a uniaxial pressure to the top face and the bottom face, where the uniaxial pressure has a single principal axis and the single principal axis is perpendicular to the top face and the bottom face, such that the uniaxial pressure acts to compress the laminate stack along the single principal axis, and maintaining the uniaxial pressure while subjecting the laminate stack to a first temperature and for a first time such that initial bonding occurs at the interfacial contact areas, wherein the first temperature is 30-60% of the absolute melting point temperature of the plurality of laminates, thereby producing an initially bonded laminate stack, wherein the uniaxial pressure and the first temperature and the first time are determined such that the initially bonded laminate stack is diffusion bonded at least between some portion of asperities in the interfacial contact areas within the laminate stack, and
   c) applying an isostatic pressure to the initially bonded laminate stack while subjecting the initially bonded laminate stack to a second temperature and for a second time such that final bonding occurs at the interfacial contact areas, wherein the second temperature is 60-90% of the absolute melting point temperature of the plurality of laminates, and wherein the isostatic pressure and the second time are determined such that the final bonding in interfacial contact areas has sufficient strength for the expected operating conditions of the component, thereby forming a component having internal voids and features in fluid communication with the exterior of the component bonding in interfacial contact areas having sufficient strength for the expected operating conditions of the component.

19. The process as recited in claim 18 wherein at least one laminate in the laminate stack has a region unsupported by the interfacial contact areas within the laminate stack.

20. The process as recited in claim 19 where the uniaxial pressure to the top face and the bottom face is applied with a clamp or a ram press oriented with respect to the laminate stack to compress the laminate stack along the single principal axis.

\* \* \* \* \*